United States Patent
Bouchard et al.

(10) Patent No.: US 11,898,278 B2
(45) Date of Patent: Feb. 13, 2024

(54) HYBRID TEXTILE FOR REINFORCING COMPOSITES

(71) Applicant: SAINT-GOBAIN ADFORS, Courbevoie (FR)

(72) Inventors: Jonas Bouchard, Paris (FR); Alexandre Garcia, Osla (NO)

(73) Assignee: SAINT-GOBAIN ADFORS, Courbevoie (FR)

( * ) Notice: Subject to any disclaimer, the term of this patent is extended or adjusted under 35 U.S.C. 154(b) by 1412 days.

(21) Appl. No.: 16/315,065

(22) PCT Filed: Jul. 4, 2017

(86) PCT No.: PCT/FR2017/000137
§ 371 (c)(1),
(2) Date: Feb. 11, 2019

(87) PCT Pub. No.: WO2018/007692
PCT Pub. Date: Jan. 11, 2018

(65) Prior Publication Data
US 2023/0193528 A1    Jun. 22, 2023

(30) Foreign Application Priority Data
Jul. 5, 2016  (FR) ........................ 1656435

(51) Int. Cl.
| | |
|---|---|
| *D03D 15/00* | (2021.01) |
| *D03D 15/217* | (2021.01) |
| *D03D 15/267* | (2021.01) |
| *C08J 5/24* | (2006.01) |
| *D03D 13/00* | (2006.01) |

(52) U.S. Cl.
CPC .............. *D03D 15/00* (2013.01); *C08J 5/247* (2021.05); *D03D 13/008* (2013.01); *D03D 15/217* (2021.01); *D03D 15/267* (2021.01); *C08J 2300/22* (2013.01); *C08J 2300/24* (2013.01);
(Continued)

(58) Field of Classification Search
None
See application file for complete search history.

(56) References Cited

U.S. PATENT DOCUMENTS

| | | | |
|---|---|---|---|
| 4,581,053 | A | 4/1986 | Prewo et al. |
| 4,950,530 | A | 8/1990 | Shibatani |

(Continued)

FOREIGN PATENT DOCUMENTS

| | | |
|---|---|---|
| CN | 101319465 A | 12/2008 |
| CN | 101769421 A | 7/2010 |

(Continued)

OTHER PUBLICATIONS

International Search Report as issued in International Patent Application No. PCT/FR2017/000137, dated Oct. 25, 2017.

(Continued)

*Primary Examiner* — Arti Singh-Pandey
(74) *Attorney, Agent, or Firm* — Pillsbury Winthrop Shaw Pittman LLP

(57) ABSTRACT

A hybrid woven textile for reinforcing a polymer matrix of a composite material that includes inorganic fibers selected from glass fibers, basalt fibers, carbon fibers, ceramic fibers, quartz fibers and silica fibers, and natural organic fibers, characterized in that the inorganic fibers and the natural organic fibers are co-woven, co-braided or co-knitted with one another.

12 Claims, 3 Drawing Sheets

(A)           (B)           (C)           (D)

(52) U.S. Cl.
CPC ...... *D10B 2101/06* (2013.01); *D10B 2201/01* (2013.01); *D10B 2505/02* (2013.01)

(56) References Cited

U.S. PATENT DOCUMENTS

| | | |
|---|---|---|
| 5,326,628 A | 7/1994 | Takahata et al. |
| 5,538,781 A | 7/1996 | Rao et al. |
| 2016/0047073 A1 | 2/2016 | Blackburn et al. |

FOREIGN PATENT DOCUMENTS

| | | |
|---|---|---|
| EP | 1 584 451 A1 | 10/2005 |
| FR | 1 204 132 A | 1/1960 |
| FR | 2 898 140 A1 | 9/2007 |
| FR | 2 910 462 A1 | 6/2008 |
| FR | 2 949 125 A1 | 2/2011 |
| FR | 3 011 255 A1 | 4/2015 |
| GB | 1 294 867 A | 11/1972 |
| WO | WO 2016/042556 A1 | 3/2016 |

OTHER PUBLICATIONS

Office Action as issued in Chinese Patent Application No. 201780042000.X, dated Sep. 30, 2020.

(A)

(B)

HYBRID TEXTILE FOR REINFORCING COMPOSITES

CROSS-REFERENCE TO RELATED APPLICATIONS

This application is the U.S. National Stage of PCT/FR2017/000137, filed Jul. 4, 2017, which in turn claims priority to French patent application number 1656435 filed Jul. 5, 2016. The content of these applications are incorporated herein by reference in their entireties.

TECHNICAL FIELD

The present invention relates generally to the field of organic polymer matrix composite materials and, more especially, to the field of reinforcing textiles that are included in the constitution of said composite materials by being embedded in an organic polymer matrix.

More precisely, the invention relates to a hybrid textile simultaneously comprising inorganic fibers and organic fibers that are natural, co-woven, co-braided or co-knitted with one another.

The invention also relates to the use of such a hybrid textile as textile reinforcement for reinforcing a polymer matrix of a composite material.

The invention finds applications, in particular, in the manufacture of composites for the transport industry, the sports industry, the energy production industry, the building industry, the construction industry or the medical industry.

Technological Background

Currently, glass fibers are used for reinforcing polymer materials, providing optimal resistance depending on their use. Glass fibers, which are inorganic, notably make it possible to reduce the weight of a structure considerably relative to steel.

Furthermore, natural fibers such as flax, hemp, sisal, etc. may be used as reinforcement of polymer materials. The use of these natural, organic fibers allows a further additional weight gain relative to the use of glass fibers.

A reinforcing fabric manufactured from natural fibers is formed by interlacing warp yarns on the one hand, and weft yarns on the other hand. In contrast, twisting, the path of the yarns (which is a function of the weave of the fabric) and anisotropy of the fibers may lead to poor orientation of the fibers and therefore alteration of the mechanical performance relative to a stack of unidirectional layers. Moreover, during manufacture of the composite with a reinforcement manufactured from natural fibers, there may be problems of migration of the matrix within the warp yarns, at the time of impregnation of the fibers with the matrix. Consequently, there is an urgent problem in that the use of natural, organic fibers does not provide reproducibility of the mechanical characteristics of the composite containing them.

The invention has the aim of supplying a composite reinforcement of low weight, possessing easily reproducible mechanical characteristics.

PRIOR ART

Conventionally, a composite material comprises a structure-forming matrix that is made of moldable plastic, and in which one or more reinforcements are embedded. Quite often, this reinforcement comprises a structure made of artificial reinforcing fibers, notably inorganic, such as glass fibers, carbon fibers or aramid fibers.

Various products based on woven glass fibers are notably described, for example, in documents U.S. Pat. No. 4,581,053 and FR 3011255.

In document US 2016/0047073, a hybrid textile material is proposed for reinforcing composites manufactured from unidirectional nonwoven bands of fibers of inorganic material (such as carbon fibers) interlaced with bands of nonwoven organic material (such as natural fibers). Natural fibers such as flax and cotton may thus be used as reinforcement of polymer materials.

In French patent application FR 2949125, a method is proposed for manufacturing a composite reinforcement by coating a yarn of natural material (flax and cotton) with a polymer material so as to form a composite reinforcement that is used in the manufacture of nonwoven textiles.

Moreover, as taught in French patent FR 1204132, which discloses a treatment for natural fibers intended for reinforcing a plastic, the use of natural fibers in the constitution of reinforcement for composite materials is a relatively old idea.

Moreover, in French patent application FR 2898140, it is proposed to mix natural flax fibers with another material, using a set of combs driven successively, so that these natural flax fibers can reinforce composite parts. What is mixed with the natural flax fibers may notably be in the form of yarns made from polypropylene or some other synthetic plastic. However, owing to their different natures, natural flax fibers and polypropylene yarns do not have the same behavior in tension, so that mixing them by means of combs cannot lead to a suitably homogeneous product.

In document WO 2016/042556 A1, a hybrid textile material is proposed, manufactured from a layer of woven textile and a synthetic layer that is incorporated by various methods.

Patent U.S. Pat. No. 5,538,781 discloses textile reinforcements for composites comprising yarns based on fibers of polyaramid, carbon and glass.

Application EP 1 584 451 describes textile reinforcing structures for composites in which metal wires are mixed with organic or mineral fibers.

Patent GB 1 294 867 discloses flame retardant hybrid textiles comprising at least 85% of non-oxidizing mineral fibers and at most 15% by weight of a particular type of nylon having self-extinguishing properties.

Lastly, patent U.S. Pat. No. 5,326,628 describes a friction material based on a textile impregnated with a bituminous material and/or a synthetic resin. The textile is manufactured from yarns consisting of a core based on ceramic fibers or glass fibers surrounded by an organic sheath made of synthetic polymer. These yarns are combined by twisting with metal wires.

There is however still a need to develop reinforcements for lightweight composites that give better reproducibility of the mechanical properties of the composites.

SUMMARY OF THE INVENTION

Therefore the aim of the invention is to propose a composite reinforcing product that is lightweight, economical and that has improved and reproducible mechanical properties so that it can be used in the transport industry, the sports industry, the energy production industry, the building industry, the construction industry and the medical industry.

It was discovered that a hybrid woven fabric that comprises natural organic fibers and inorganic fibers can serve as reinforcement for manufacturing lightweight composites having excellent mechanical properties, such as excellent impact resistance.

Thus, the applicant has developed a hybrid fabric that is woven, braided or knitted comprising or consisting of natural organic fibers and of inorganic fibers making it possible, when it is used as composite material reinforcement, to obtain the required mechanical properties and a low weight.

Thus, according to a first aspect, the invention proposes a hybrid textile product comprising inorganic fibers chosen from glass fibers, basalt fibers, carbon fibers, ceramic fibers, quartz fibers or silica fibers, and natural organic fibers, the inorganic fibers and the natural organic fibers being co-woven, co-braided or co-knitted with one another.

In a second aspect, the invention relates to a prepreg, i.e. a semifinished product, comprising at least one such hybrid textile and a thermoplastic or thermosetting resin, the resin representing preferably from 5 to 30 wt %, more preferentially from 10 to 25 wt % of the prepreg.

In a third aspect, the invention relates to a textile reinforcement for reinforcing a polymer matrix of a composite material, which comprises at least one hybrid textile according to the first aspect above, this hybrid textile being permeable to the polymer matrix of the composite material.

In a fourth aspect, the invention relates to the use of such a hybrid textile, of such a reinforcement or of such a prepreg for reinforcing a polymer matrix of a composite material.

In a fifth aspect, the invention relates to the use of such a hybrid textile, of such a reinforcement or of such a prepreg for manufacturing a composite comprising an organic polymer matrix and a textile reinforcement.

Lastly, the invention relates, according to a sixth aspect, to a composite formed of an organic polymer matrix and of at least one hybrid textile according to the first aspect or a textile reinforcement according to the third aspect above.

The invention will be better understood and other features and advantages of the invention will become clearer on reading the nonlimiting description given hereunder.

The latter is purely illustrative and must be read with reference to the appended drawings, where:

DETAILED DESCRIPTION OF EMBODIMENTS

Figure 1:
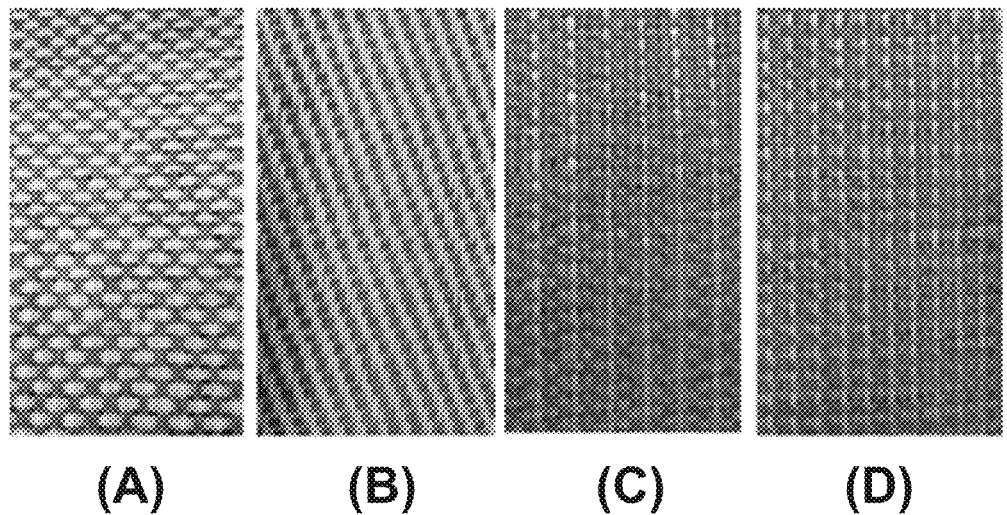
FIG. 1 shows four examples of woven hybrid fabrics according to the invention designated A, B, C and D. Fabric A is a plain weave comprising flax warp yarns and glass-fiber weft yarns; fabric B is a 2×2 twill weave comprising flax warp yarns and glass-fiber weft yarns; fabrics C and D are plain weaves comprising flax and glass-fiber warp yarns and only flax weft yarns.
Figure 2:
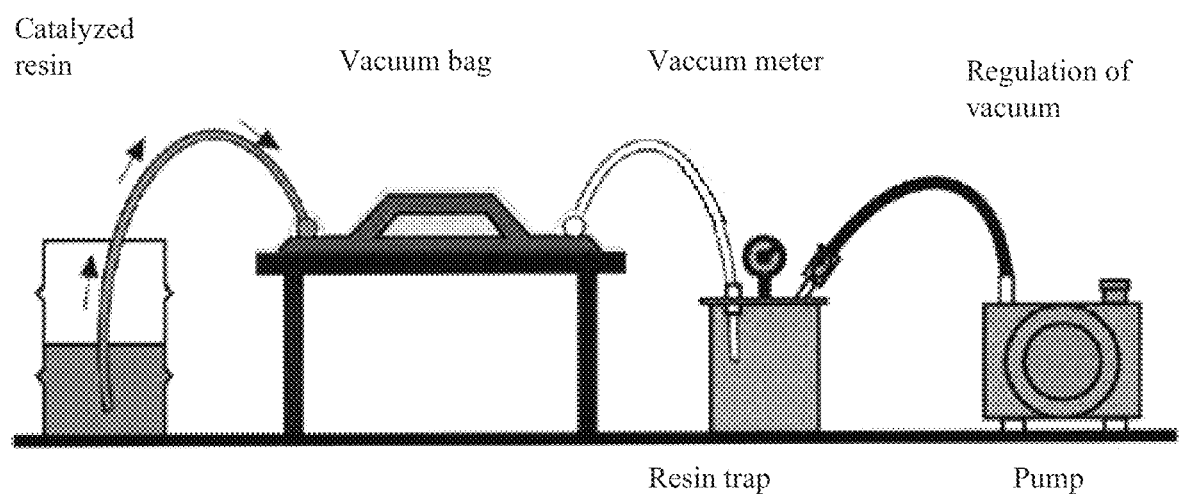
FIG. 2 shows a very schematic view of a method of manufacturing composites by vacuum infusion.

A first aspect of the invention relates to a woven, knitted or braided hybrid textile that comprises inorganic fibers and natural organic fibers.

It is preferably free from synthetic organic fibers.
It is preferably free from metal fibers.
The hybrid textile according to the invention is preferably a woven hybrid textile.

In a preferred embodiment, it is a hybrid textile comprising yarns based on inorganic fibers, yarns based on organic fibers and/or yarns based on organic fibers and inorganic fibers (hybrid yarns).

In other words, the hybrid textile of the invention may comprise inorganic fibers and natural organic fibers combined in yarns, which, in their turn, are combined together by weaving, knitting and braiding. It is important to note that, in the structure of the hybrid textile of the invention, there are always natural organic fibers and inorganic fibers included in the composition of the yarns that form the structure of the woven hybrid fabric.

In the present description of embodiments of the invention the terms "textile product", "textile" and "fabric" are used indiscriminately.

"Textile product" or "textile" or "fabric" means any material that can be manufactured by weaving, knitting or braiding, which divides into yarns and/or fibers and which—in contrast to the nonwoven products, in which the fibers remain random—has an ordered interlacing of yarns or fibers.

The textile product may notably be obtained by weaving, i.e. by interlacing, in the same plane, yarns arranged in the direction of the "warp" (called warp yarns hereinafter) and yarns arranged in another direction, most often perpendicular to the warp yarns, in the direction of the "weft" (called weft yarns hereinafter). The weft yarn is a yarn extending in the direction of the width of the textile band. The warp yarn extends in the direction of the length. It is the interlacing of these two yarns that produces a fabric. It is understood that the weft is formed by one or more parallel yarns and that the warp is also formed by one or more parallel yarns. The bond obtained between these warp yarns and weft yarns is defined by a weave. Of course, weaving comprises a great variety of methods, which give different types of weaves (simple or plain weaving, double weaving, combined weave, twill or serge, satin weave, etc.).

The manufacture of a hybrid textile according to the invention may be carried out in a conventional installation that is suitable for the manufacture of fabrics in general, and in particular for the manufacture of fabrics with yarns based on inorganic fibers such as glass fibers.

The method by which these yarns are woven together has an influence on the characteristics of the fabric, notably its mechanical characteristics.

The variations of parameters thus cause the properties of the fabric to vary: the number of yarns per unit of length used in the direction of the weft and of the warp (one or more weft and warp yarns, respectively), the twist, the weave, the angle between the yarns (for example between the weft yarns and the warp yarns), etc. A person skilled in the art will select the manufacturing method and parameters that are most appropriate for using the textile of the invention, according to the specific nature of the application envisaged.

When carrying out the method of weaving, for controlling the tension between the yarns and in order to maintain constant tension between the two types of yarns (yarns made up of natural organic fibers and yarns made up of inorganic fibers), co-weaving may be carried out by preparing the warp yarns in various ways:

by direct warping on the looms, the warp yarns being arranged parallel to one another directly on the beam from bobbins arranged in a creel; or by sampling warping using a double beam on the loom at the laboratory level, for example.

Warping may also be sectional, in the sense that the warp yarns are laid parallel in sections on the warping cylinder. A setting-up operation then allows the warp yarns to be transferred from the warper to the beam while maintaining constant tension.

The textile product of the invention may also be manufactured by knitting. Knitting is a technique used for manufacturing a fabric by formation of knots, starting from a single yarn or several yarns. Various knitting techniques are available to the person skilled in the art such as, among others, weft knitting or thrown-stitch or warp knitting, it being possible to use the latter for making runproof articles).

The organic fibers are natural organic fibers of animal origin or of vegetable origin, preferably of vegetable origin.

Vegetable fibers may be selected from the group consisting of flax, hemp, cotton, jute, nettle, sisal, coconut, raffia, abaca, broom, and more generally any spinnable vegetable fiber.

Animal fibers may be selected from the group consisting of angora, cashmere, mohair, wool of sheep, camel, alpaca or vicuna, silk, spider filaments, such as from the spider *Nephila clavipes*, and more generally any spinnable animal fiber.

Natural organic fibers also encompass the artificial fibers obtained by chemical treatment (for example dissolution followed by precipitation) of natural materials such as milk caseins (Lanital), cellulose from various plants such as pine bark, bamboo, soy, birch (rayon or viscose).

Artificial fibers may be selected from the group consisting of cellulose acetate (*Rhodia*), alginate, Ardil, Arlan, Casenka, Coslan, Cupro, Fibrolane, Lanital, Merinova, Polynosique (Meryl or Zantrel), Silcool, cellulose triacetate (Rhonel), Vicara, or viscose, for example. This is not an exhaustive list.

"Inorganic fibers" are selected from the group consisting of basalt, carbon, ceramic, silica, glass, quartz.

The organic fibers and inorganic fibers are collected together to form a long assembly in the form of yarns. Thus, the yarn used in the textile product of the invention corresponds to all products from the spinning industries, constituting an assemblage of fibers that have been treated, such as by twisting, to ensure cohesion between the fibers. Thus, a yarn proper, a tape, a twisted yarn, a double-twist yarn, a cable, etc., may be used for the invention.

The natural organic fibers may be treated to facilitate their use in a reinforcing fabric for composite material.

Thus, for use as reinforcement of composite material, vegetable fibers are obtained from the processing chain of the textile industry. This sector of industry has developed techniques for separating the fibers from the rest of the plant. The techniques used for separating and preparing the fibers are, notably:

retting: hydrolysis of the pectose that binds the fibers. This operation may be carried out in water (running water or other), by dew retting or industrially using chemicals or enzymes. For flax, dew retting is the commonest method;

grinding: fragmentation of the woody parts;

scutching: separation of the ligneous fragments from the wood of the plant; and combing and carding: disentangling of the fibers.

To obtain high-performance composite materials, additional treatments may be necessary: separation of the fibers, cleaning of their surface, improvement of wetting of the fibers by the polymer, obtaining a good-quality bond between fiber and matrix and, in certain cases, decreasing the hydrophilicity. Wetting is a condition that is necessary but not sufficient for obtaining good adherence of the polymer matrix to the textile reinforcement. In a composite material, fiber/matrix adherence plays a very important role in the transmission of stresses between the fibers and resistance to aging. The treatment or treatments are selected depending on the nature of the fibers. These treatments use various products or "additives".

Examples of Treatments are:

chemical treatments to modify the surface composition of the fibers and create chemical bonds with the polymer, for example using compounds such as silanes, isocyanates and carboxylic acids;

physicochemical treatments such as ozonization, cold plasma and electron beam irradiation;

an alkaline treatment with soda to remove lignin, pectin and the waxes covering the outside surface of the natural fibers. This type of treatment causes an increase in surface roughness, swelling, stabilization of the fibers and a reduction in hydrophilicity;

acetylation treatments of cellulose or hemicellulose with acetic anhydride in order to increase dimensional stability and resistance to environmental degradation;

thermal treatments at a temperature above 180° C. These types of treatments, carried out under inert atmosphere, act on the properties of the hemicelluloses and of lignin, which improves both dimensional stability and durability;

treatments to improve fire resistance; and enzymatic treatments making it possible, by appropriate choice of enzymes, to attack the middle lamellae, ensuring cohesion within the bundles of fibers and therefore facilitating their extraction and modifying their surface.

The organic fibers and the inorganic fibers may also be treated to improve fiber/matrix adherence with a chemical surface treatment called sizing. Sizing consists of applying a sizing composition comprising at least one agent that provides protection against abrasion, notably during passage of the yarns through the dies of the loom, increases the stiffness of the filaments, improves the fiber/matrix interface and prepares bonding (for example glass/resin), facilitates impregnation by the resin during execution and removes electrostatic charges.

In some embodiments, the organic and/or inorganic fibers that form the yarns of the hybrid fabrics according to the invention are treated in this way with a sizing composition.

The amount of size (dry extract) deposited on the organic and/or inorganic fibers of the hybrid woven textile of the invention is of the order of 0.1 to 10%, preferably from 0.3 to 3 wt %. The carrier liquid generally used is water, which represents 85 to 95% of the sizing composition.

For the sizing compositions for glass-fiber yarns, reference may be made to the sizing agents described in the work "Glass fibers for reinforcement" Techniques de l'ingénieur, "Plastiques et Composites" treatise. As an example, the size used in the present invention comprises the following elements:

a film-forming agent (3 to 10%) that binds the filaments together and thus gives the yarn integrity and protection, and that will allow impregnation with a matrix. It mainly consists of polyvinyl acetate, epoxy or polyester resins, starch, etc.;

lubricants (0.05 to 1%) that have a role of protection against abrasion during manipulations of the yarn. Their main components are ammonium surfactants and amines;

an antistatic agent (0 to 0.3%) that has the role of removing the electrostatic charges. It is an alkaryl sulfonate or a quaternary ammonium salt; and a coupling agent (0.2 to 0.7%) that will allow bonds to be created, on the one hand with the matrix and on the other hand with the fiber, it is generally an organosilane, a titanate or a zirconate.

The glass-fiber yarns used in the present invention are necessarily provided with sizing of the aforementioned type. This results from their method of manufacture, which comprises an obligatory step of application of a sizing composition on the filaments during stretching and before they are collected into one or more yarns as explained later.

Thus, the term "additives" is used in the present description to denote, in a nonlimiting way, any product added in the treatments mentioned above: notably sizing as mentioned above, but also functionalized polymers, colorants, UV absorbents, softeners, flame retardants etc., endowing the fabric of the invention with particular properties.

The additive is preferably selected from sizing, functionalized polymers, colorants, UV absorbents, softeners, flame retardants.

In one embodiment, the hybrid textile according to the invention is characterized in that the organic fibers are treated with a sizing composition, it being understood that the inorganic fibers are necessarily treated with a sizing composition as stated above.

The hybrid fabric of the invention may comprise in addition to the natural organic and inorganic fibers, from 0.1 to 20 wt % of one or more additives, preferably a size, notably from 0.2 to 10 wt % of one or more additives, preferably a size, and notably from 0.1 to 5 wt % of one or more additives, preferably a size.

The yarns of inorganic fibers used in the present invention are, among others a) yarns consisting of parallel continuous filaments without twisting (or base yarns); these products are called textile glass multifilament products; or, b) assemblies of several base yarns called rovings.

The aforementioned yarns are no-twist yarns. Although they have lower performance, the scope of the invention also includes twisted yarns that have at least 5, at least 10, at least 15 or at least 20 turns/m.

Glass fibers usable according to the invention and the method of manufacture thereof are described, for example, in the work "Glass fibers for reinforcement", Techniques de l'ingénieur, "Plastiques et Composites" treatise, or in document FR2910462. The glass-fiber yarns are produced in a known manner by mechanical stretching of streams of molten glass flowing from multiple orifices of a die to form filaments, which are then assembled into one or more yarns, each collected on a sleeve supported by a winder. The glass included in the constitution of the yarns may be of any type, for example E, C, E-CR, D, R, A, S, S2, AR (alkali-resistant). Glass E is preferred.

The diameter of the glass filaments making up the yarns may vary widely, for example from 5 to 24 µm, preferably from 6 to 16 µm and better still from 8 to 13 µm. Similarly, there may be wide variations in the linear weight of the yarn, which may range from 10 to 10000 tex and preferably from 100 to 2500 tex.

In a preferred embodiment, the inorganic yarns consist to more than 50 wt % of glass, preferably to more than 75% and advantageously to 100%.

Different types of natural organic fibers may be combined to form yarns, for example yarns made up of flax and cotton fibers, silk and flax fibers.

Different inorganic fibers may be combined to form inorganic mixed yarns, for example yarns made up of glass and carbon fibers.

The yarns may be hybrid, i.e. simultaneously made up of organic and inorganic fibers in various proportions, for example such as yarns made up of flax fibers and glass fibers.

In a particular embodiment, at least one of the or warp yarns of the woven mixed fabric of the invention is a hybrid yarn.

In a particular embodiment, the hybrid yarns comprise from 5 to 95 wt % of organic fibers, from 5 to 95 wt % of inorganic fibers and from 0 to 50 wt % of one or more additives selected from the aforementioned components; notably from 10 to 40 wt % of inorganic fibers, from 30 to 90 wt % of organic fibers and from 0.2 to 20% of one or more additives, notably from 10 to 30 wt % of inorganic fibers, from 70 to 90 wt % of organic fibers and from 0.2 to 20 wt % of one or more additives, notably from 15 to 25 wt % of inorganic fibers, from 75 to 85% of organic fibers and from 0.1 to 20 wt % of one or more additives; notably from 10 to 30 wt % of organic fibers, from 70 to 90 wt % of inorganic fibers and from 0.2 to 20 wt % of one or more additives, notably from 15 to 25 wt % of organic fibers, from 75 to 85 wt % of inorganic fibers and from 0 to 20 wt % of one or more additives; the sum of the organic fibers, inorganic fibers and/or additives being equal to 100%.

In a preferred embodiment, the inorganic fibers are glass fibers, the organic fibers are flax fibers. The additive is in this case a size applied on the organic fibers or yarns. Preferably, the hybrid textile contains from 35 to 45 wt % of glass fibers, from 40 to 55 wt % of flax fiber and from 1 to 5 wt % of size.

As mentioned above, in the woven structure of the hybrid textile of the invention, there must always be natural organic fibers and inorganic fibers in the composition of the yarns that form said fabric. The nature and the proportion of the organic fibers and inorganic fibers in the yarns that form the structure of the woven hybrid fabric of the invention will be selected according to the use and the method of weaving of the fabric of the invention.

In a particular embodiment, the organic fibers represent at least 10 wt %, at least 20 wt %, at least 30 wt %, notably at least 50 wt %, notably at least 60 wt %, notably at least 70 wt %, notably at least 80 wt %, notably at least 90 wt %, notably at least 95 wt % of the total weight of the woven hybrid fabrics according to the invention.

In a particular embodiment, the inorganic fibers represent at least 10 wt %, at least 20 wt %, at least 30 wt %, notably at least 50 wt %, notably at least 60 wt %, notably at least 70 wt %, notably at least 80 wt %, notably at least 90 wt %, notably at least 95 wt % of the total weight of the woven mixed fabrics according to the invention.

In a particular embodiment, the hybrid textile of the invention comprises from 5 to 95 wt % of organic fibers, from 5 to 95 wt % of inorganic fibers and from 0 to 50 wt % of one or more additives selected from the aforementioned additives.

In a preferred embodiment, the hybrid textile comprises from 50 to 90 wt %, preferably between 60 and 90 wt %, more preferentially between 70 and 90 wt %, and even more preferentially between 80 and 90 wt % of natural organic fibers, and from 10 to 50 wt %, preferably from 10 to 30 wt %, more preferentially from 10 to 20 wt % of inorganic fibers, these percentages being expressed relative to the total mass of natural organic and mineral fibers.

According to a particular embodiment, the hybrid textile according to the invention is a woven textile obtained by weaving.

Weaving is the interlacing, in one and the same plane, of yarns arranged in a first direction in the direction of the "warp" and of yarns arranged in another direction, preferably perpendicular to the warp yarns, in the direction of the "weft". Multiple combinations may be envisaged but the final fabric will always have natural organic fibers and inorganic fibers co-woven with each other:

- weft yarns made up of 100% natural organic fibers and warp yarns made up of 100% inorganic fibers;
- weft yarns made up of 100% inorganic fibers and warp yarns made up of 100% natural organic fibers;
- weft yarns made up of at least 99 wt % of organic fibers and warp yarns made up of at least 99 wt % of inorganic fibers;
- weft yarns made up of at least 70 wt % of organic fibers and warp yarns made up of at least 70 wt % of inorganic fibers;
- hybrid weft yarns and warp yarns made up of 100% organic fibers;
- hybrid weft yarns and warp yarns made up of 100% inorganic fibers;
- hybrid warp yarns and weft yarns made up of 100% organic fibers;
- hybrid warp yarns and weft yarns made up of 100% inorganic fibers; or,
- hybrid weft yarns and hybrid warp yarns.

In a particular embodiment, the hybrid textile of the invention is obtained by weaving and is characterized in that the warp and/or the weft comprise more than one yarn per unit of length, i.e. 2, 3, 4, 5, 6, 7, 8, 9, 10, 11, 12, 13, 14, 15, 16, 17, 18, 19, 20, from 20 to 30, from 30 to 40, from 40 to 50, from 50 to 60, from 60 to 70, from 70 to 100 yarns per centimeter.

Taking into account that the spinning industry can supply yarns with a very variable linear weight (weight in grams/1000 meters of yarn) (for example from 34 to 10000 tex), it is possible to obtain fabrics with a desired weight. For example by combining yarns of reduced linear weight in the direction of the warp and/or of the weft it is possible to obtain fabrics of low weight.

Thus, in a preferred embodiment the warp comprises one or more yarns based on organic fibers and/or one or more yarns based on inorganic fibers and/or one or more hybrid yarns; and the weft comprises one or more yarns based on organic fibers and/or one or more yarns based on inorganic fibers and/or one or more hybrid yarns. The various possibilities and compositions of the different yarns (organic, inorganic and hybrid yarns) have been described above.

In a preferred embodiment the hybrid fabric of the invention is manufactured by weaving and comprises from 50 to 90 wt % of natural organic fibers, preferably flax fibers, from 10 to 50 wt % of inorganic fibers, preferably of glass, and from 0 to 50 wt % of one or more additives selected from the aforementioned additives, for example a size; and the warp comprises two natural organic yarns, preferably of flax, and an inorganic yarn, preferably of glass, per centimeter and the weft comprises one or more organic yarns, preferably of flax, per centimeter.

Generally the yarns used in the present invention have a linear weight between 10 and 10000 tex, notably between 34 and 5000 tex, notably between 100 and 1000 tex, notably between 500 and 3000 tex. Preferably, the linear weight of the yarns is between 300 and 2500 tex. Advantageously, the linear weight of the organic yarns is less than that of the inorganic yarns.

The woven hybrid textiles advantageously have:
- a thickness below 30 mm, preferably between 0.2 mm and 5 mm, notably between 1 and 4 mm, notably between 1.5 and 3 mm, preferably between 2 and 3.5 mm, and/or
- a weight per unit area between 30 and 3000 $g/m^2$, preferably between 100 and 2000 $g/m^2$, preferably between 100 and 1200 $g/m^2$, preferably between 100 and 1000 $g/m^2$.

A further aim of the invention is to allow the manufacture of composite materials reinforced by the hybrid textiles of the invention.

For this purpose, several hybrid textiles according to the invention may be superposed and assembled. Each hybrid textile and also the assembly of hybrid textiles are preferably permeable to the polymer forming the polymer matrix. This permeability is ensured by a relatively loose structure allowing the yarns a certain mobility, or even holes or open loops allowing the passage of the polymer composition.

Furthermore, in order to be permeable to the polymer matrix, the hybrid textile according to the invention is free of a binder or of a finish capable of blocking the holes or open loops.

The hybrid textile according to the invention or the assembly of hybrid textiles according to the invention may be impregnated directly with a polymer matrix with a view to forming a composite, or else it may be used for the preparation of a semifinished product, referred to as a prepreg, which will be embedded in the polymer matrix.

The prepreg is preferably manufactured by impregnating the hybrid textile with a thermosetting or thermoplastic resin composition, preferably a thermosetting resin. This prior impregnation of the hybrid textile by an organic resin facilitates, as is known, the manufacture of the composite by improving the compatibility of the textile reinforcement with the polymer matrix.

The amount of resin in the prepreg is generally between 5 and 30 wt %, preferably between 10 and 25 wt % relative to the total weight of the prepreg.

In a particular embodiment, the composite may comprise several layers of fabric according to the invention, as described above. Optionally, layers of hybrid textile of the invention may be used in combination with layers of nonwoven textile or of other non-hybrid textiles.

According to a particular embodiment, the reinforcement of the invention has at most 50 layers of hybrid textile of the invention, notably from 2 to 10, notably from 5 to 20, notably from 20 to 30 layers, and preferably between 4 and 15 layers. The number of layers will be selected according to the desired application and the type of composite.

The woven hybrid textile of the invention included in the constitution of the reinforcement of the invention has a weight per unit area that varies from 30 to 3000 $g/m^2$, preferably from 100 to 2000 $g/m^2$, advantageously from 100 to 1200 $g/m^2$ and better still from 100 to 1000 $g/m^2$.

The matrix may be thermoplastic, for example: polyesters, vinyl ester resins, polyurethanes (PU), poly(bismaleimides), poly(lactic acid) (PLA), poly(hydroxy alkanoates) (PHA), poly(ethylene terephthalate) (PET), polyamides (PA), polypropylene (PP), poly(butylene terephthalate) (PBT), polyethylenes (PE), polycarbonate (PC), polyvinyl chloride (PVC).

It should be noted that the degradation temperature of the vegetable fibers is between 200° C. and 230° C.

The matrix may also be based on thermosetting resins such as urea-formaldehyde (UF) resins, melamine-formaldehyde (MF) resins or phenol-formaldehyde (PF) resins, polyepoxides or epoxides (EP), polybismaleimides (BMI), thermosetting polyimides (PIRP), crosslinked polyurethanes (PUR), unsaturated polyesters (UP), vinyl esters (VE), vulcanized elastomers, polyisocyanurates and polysiloxanes.

Throughout the foregoing description and in the claims, the expressions "comprising a" and "containing a" must be understood as being synonyms respectively of the expressions "comprising at least one" and "containing at least one" unless stated otherwise.

Throughout the description, the ranges of values are understood as including the limits, unless stated otherwise.

Methods for Forming the Composite of the Invention

The composite of the invention comprising a woven hybrid textile of the invention may be obtained by any type of method of manufacturing composites that gives a composite and in which the resin is able to penetrate into the weaving of the reinforcement of the invention and impregnate it. It may for example be methods by extrusion, infusion or vacuum infusion, low-pressure injection molding of liquid resin (RTM), "hand layup", SMC (sheet molding compound), autoclave and bulk molding (BMC).

The final composite must generally have the best possible impact resistance, the least possible uncontrolled porosity (no gas bubbles unintentionally trapped), and the best possible surface appearance, notably the edge (narrow face) of the final parts.

The advantages of the composite reinforcement of the invention result notably from its low weight, comparable to natural fibers, but it has better mechanical characteristics than the latter, for example a better impact resistance.

The invention finds applications, in particular, in the manufacture of composites for the transport industry, sports industry, energy industry, building, construction, the medical industry, among others. In these applications there must be an appropriate response to the constraints on mechanical strength, while keeping the objects light.

EXAMPLES

The advantages offered by the fabrics according to the invention, the reinforcements according to the invention and the composites according to the invention will be better appreciated from the following examples, illustrating the present invention but without limiting it.

FIG. 1 shows four examples of hybrid woven fabrics with co-woven flax yarns and glass-fiber yarns. In these examples, various methods of co-weaving were used (plain weave, 2/2 twill weave) to obtain this combination of fibers.

The Yarns Used are:
no-twist flax yarns—Nattex of 1300 tex from DEHONDT
no-twist glass-fiber yarns—Zerotwist—from Vetrotex—2400 tex (EC22 2400 T99C) (weft yarn); and/or
no-twist glass-fiber yarns—Zerotwist—from Vetrotex—2040 tex (EC20 2040 T99C) (warp yarn).

The flax yarns have been sized, giving them mechanical durability and cohesion during weaving on a loom. This sizing is also compatible with the polymer matrix used during preparation of the final composite.

Table 1 below shows various samples numbered from B1 to B10. This table gives the properties of the various fabrics, namely, in the example considered here: the reference of each sample in which the letter F denotes flax, the letter G denotes glass and the number denotes the weight expressed in g/m², the type of warp, the type of weft and the type of weave (P for plain weave and T for twill weave).

Comparative samples B1 and B4 are fabrics in plain weave (P) and in 2/2 twill weave (T) made up only of flax of 1300 tex.

Comparative samples B7 and B8 are fabrics in plain weave (P) and in 2/2 twill weave (T) made up only of glass-fiber yarns of 2400 tex.

Comparative samples B9 and B10 are nonwoven fabrics of flax and of glass respectively, with two types of weight, namely 350 g/m² and 600 g/m², respectively.

Samples according to the invention B2, B3, B5 and B6 are from hybrid woven textiles of flax and of glass.

Sample B2 is a hybrid textile in plain weave with a weight of 850 g/m² and made up of flax yarns (1300 tex) in the warp and of glass-fiber yarns (2400 tex) in the weft.

Sample B3 is a hybrid textile in 2/2 twill weave with a weight of 850 g/m² and made up of flax yarns (1300 tex) in the warp and of glass-fiber yarns (2400 tex) in the weft.

Sample B5 is a hybrid textile in plain weave with a weight of 575 g/m² and made up of 2 flax yarns (1300 tex) for 1 glass-fiber yarn (2040 tex) in the warp, on the one hand, and of flax yarns (1300 tex) in the weft, on the other hand.

Sample B6 is a hybrid textile in plain weave with a weight of 550 g/m² and made up of 1 flax yarn (1300 tex) for 1 glass-fiber yarn (2040 tex) in the warp, on the one hand, and flax yarns (1300 tex) in the weft, on the other hand.

TABLE 1

Properties of the woven and nonwoven textiles

| Sample | Ref. | Weight | Warp | Weft | Weave |
|---|---|---|---|---|---|
| B1 | P1 F/F | 500 | flax 1300 tex - 1.5 yarns/cm | flax - 1300 tex - 2.4 | Plain weave |
| B2 | P1 F/G | 850 | flax 1300 tex - 1.5 yarns/cm | glass - 2400 tex - 2.7 | |
| B3 | T2 F/G | 850 | flax 1300 tex - 1.5 yarns/cm | glass - 2400 tex - 2.7 | Twill 2/2 |
| B4 | T2 F/F | 450 | flax 1300 tex - 1.5 yarns/cm | flax 1300 tex - 2.4 | |
| B5 | P1 FG/F | 575 | Mix 2 flax yarns/ 1 glass yarn - 1.5 yarns/cm flax: 1300 tex/ glass | flax 1300 tex - 2.4 yarns/cm | Plain weave |
| B6 | P1 FG/F | 550 | Mix 1 flax yarn/ 1 glass yarn - 1.5 yarns/cm flax: 1300 tex/ glass | flax 1300 tex - 2.4 yarns/cm | |
| B7 | P1 G/G | 1000 | glass 2040 tex - 1.5 yarns/cm | glass - 2400 tex - 2.7 yarns/cm | |
| B8 | T2 G/G | 1100 | glass 2040 tex - 1.5 yarns/cm | glass - 2400 tex - 2.7 yarns/cm | Twill 2/2 |
| B9 | V3 F 350 | 350 | | | Non woven |
| B10 | V3 G 600 | 600 | | | Non woven |

The various textiles (B1-B10) described in Table 1 are used as reinforcements for manufacturing ten composites R1 to R10 by the vacuum infusion technique. In the example illustrated, the resin is an orthophthalic polyester (NORSO- DYNE 115284 obtainable from POLYNT Composites). This resin, which is classified in the ortho-resins, is a cold-cast material cast at a temperature of about 20° C. The catalyst material used is an organic peroxide (PMEC which may be obtained from SF Composites) and the accelerator used is cobalt octanoate with 6% of active oxygen which may be obtained from FOURNIER Composites.

Composite structures reinforced by the textiles of Table 1 are thus obtained. Table 2 shows the composites obtained (R1 to R10) with their characteristics such as the amount of flax (in percentage by weight), the amount of glass (in percentage by weight), the number of layers of fabric, the thickness of the reinforcement (in mm), the percentage by volume of reinforcement and the density of the composite obtained.

TABLE 2

Characteristics of the various composites

| Sample No | Nomenclature/ Ref. fabric | Weight of flax (wt. %) | Weight of glass (wt. %) | Density of fiber reinforcement | Number of layers |
|---|---|---|---|---|---|
| R1 | P1 F/F 500 | 100 | 0 | 1.5 | 4 |
| R2 | P1 F/G 850 | 23 | 77 | 2.22 | 4 |
| R3 | T2 F/G 850 | 23 | 77 | 2.22 | 4 |
| R4 | T2 F/F 450 | 100 | 0 | 1.5 | 4 |
| R5 | P1 FG/F 575 | 81 | 19 | 1.63 | 4 |
| R6 | P1 FG/F 550 | 73 | 23 | 1.7 | 4 |
| R7 | P1 G/G 1000 | 0 | 100 | 2.6 | 4 |
| R8 | T2 G/G 1100 | 0 | 100 | 2.6 | 4 |
| R9 | V3 F 350 | 100 | 0 | 1.5 | 2 |
| R10 | V3 G 600 | 0 | 100 | 2.6 | 4 |

| Sample No | Thickness of reinforcement (mm) | Thickness of composites (mm) | Reinforcement volume (vol %) | Density of composite |
|---|---|---|---|---|
| R1 | 1.352 | 4.64 | 29 | 1.287 |
| R2 | 1.517 | 4.22 | 36 | 1.568 |
| R3 | 1.517 | 3.67 | 41 | 1.623 |
| R4 | 1.352 | 4.07 | 33 | 1.300 |
| R5 | 1.336 | 4.04 | 33 | 1.342 |
| R6 | 1.327 | 4.18 | 32 | 1.357 |
| R7 | 1.468 | 3.90 | 38 | 1.727 |
| R8 | 1.468 | 3.79 | 39 | 1.743 |
| R9 | 0.467 | 3.47 | 13 | 1.240 |
| R10 | 0.923 | 2.60 | 36 | 1.697 |

The manner of determining the properties of the textiles considered will now be described.

Various mechanical tests were first carried out to evaluate the performance of the composites reinforced with the hybrid woven textiles of the invention compared to fabrics comprising 100% flax or 100% glass and compared to nonwoven textiles.

Tests for evaluating the elastic modulus in tension of the composites were carried out according to the specifications of standard NF EN ISO 527-4 July 97-Type 3.

The associated test conditions for the tensile test are thus as follows:
Tensile test conditions according to standard NF EN ISO 527-4 Jul. 1997-Type 3;
Test conditions: 21.6° C., 51.3% RH;
Conditioning: Dry;
Preload: 1 MPa;
Testing speed: 2 mm/min; and
L0—standard travel: 50 mm.

Tests for evaluating the elastic modulus in bending of the composites were carried out according to the specifications of standard NF EN ISO 14125.

Figure 3A:
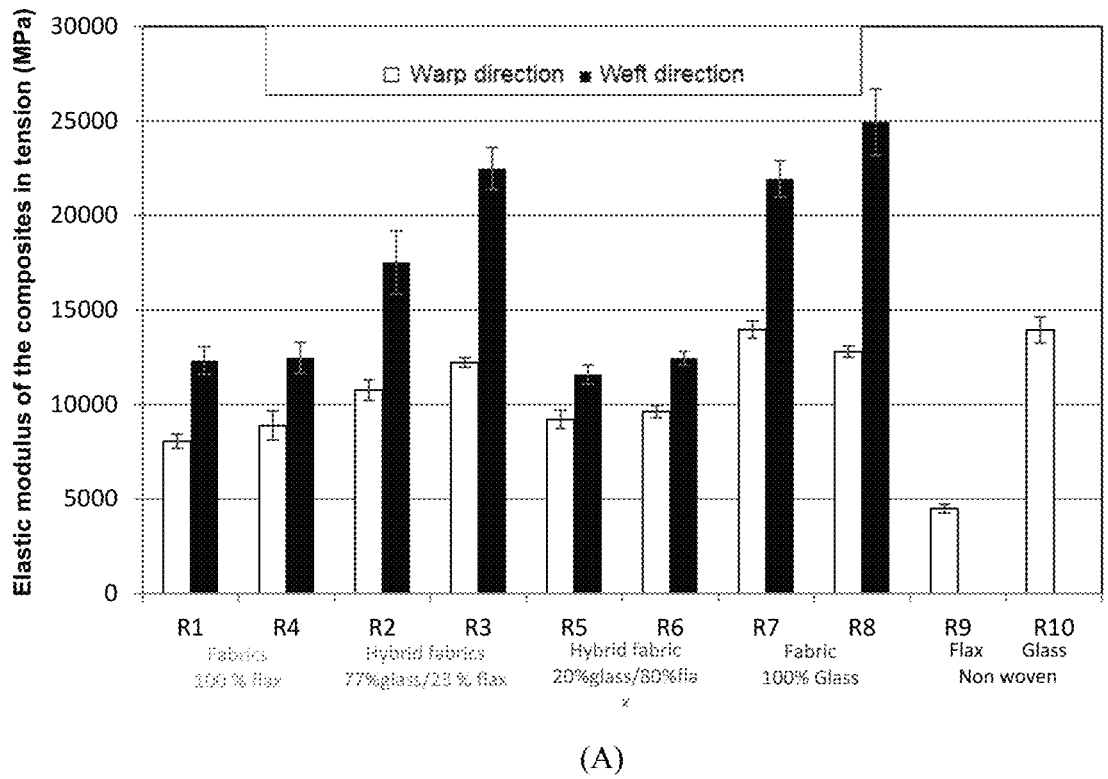
FIG. 3A shows the values of the elastic moduli in tension obtained by measurement in the warp and weft direction, respectively.

The associated norms and test conditions for the bend test are as follows:
Conditions of the 3-point bend test according to standard NF EN ISO 14125:
Test conditions: 21.5° C., 50.5% RH
Conditioning: Dry
Preload: 10 N
Testing speed: 5 mm/min
Distance between supports: 81 mm
Radius of the supporting rollers: 5 mm
Radius of the bending punch: 5 mm
Difference between the sensors: 96 mm FIG. 3A presents the values of the elastic moduli in tension obtained by measurement in the warp and weft direction, respectively.

Figure 3B:
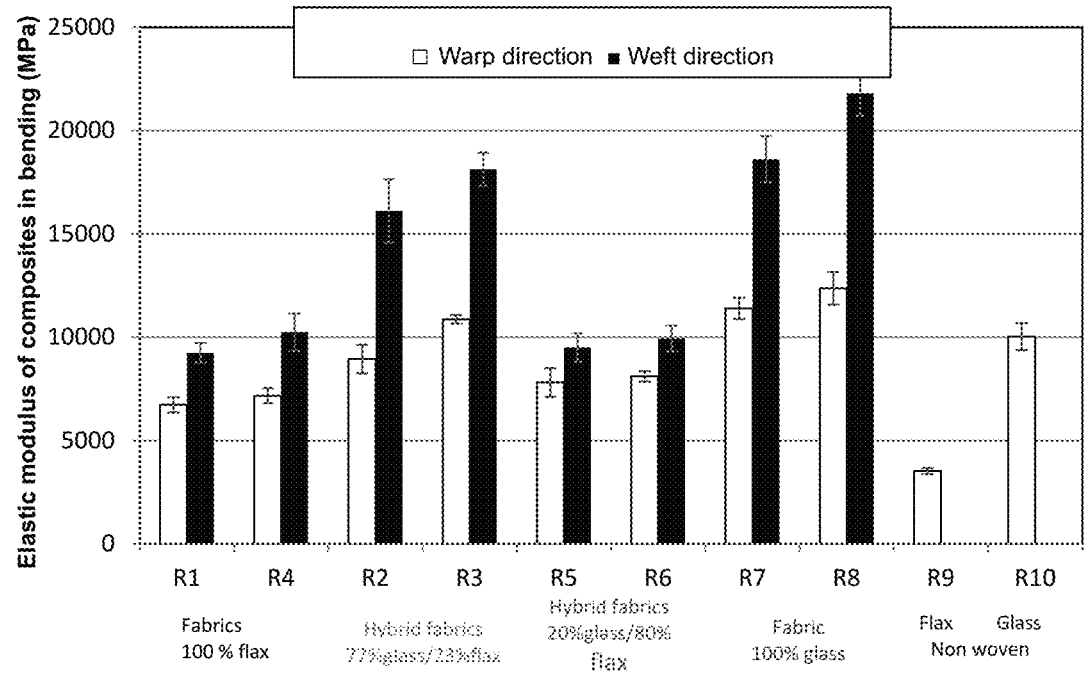
FIG. 3B shows the values of the elastic moduli in bending obtained by measurement in the warp and weft direction, respectively.

FIG. 3B presents the values of the elastic moduli in bending obtained by measurement in the warp and weft direction, respectively.

It will be noted that the composites with woven reinforcement (samples R1-R8) have higher tensile strength than the composites with nonwoven reinforcements (samples R9 and R10), in particular for the nonwovens based on flax fibers (R9).

The composites with woven reinforcement with 100% glass (samples R7 and R8) or with high percentages of glass (samples R2 and R3) have an elastic modulus in tension and an elastic modulus in bending that are relatively similar, i.e. replacing a portion of the glass fibers with lighter natural fibers does not lead to a significant loss of the mechanical properties.

Figure 4:
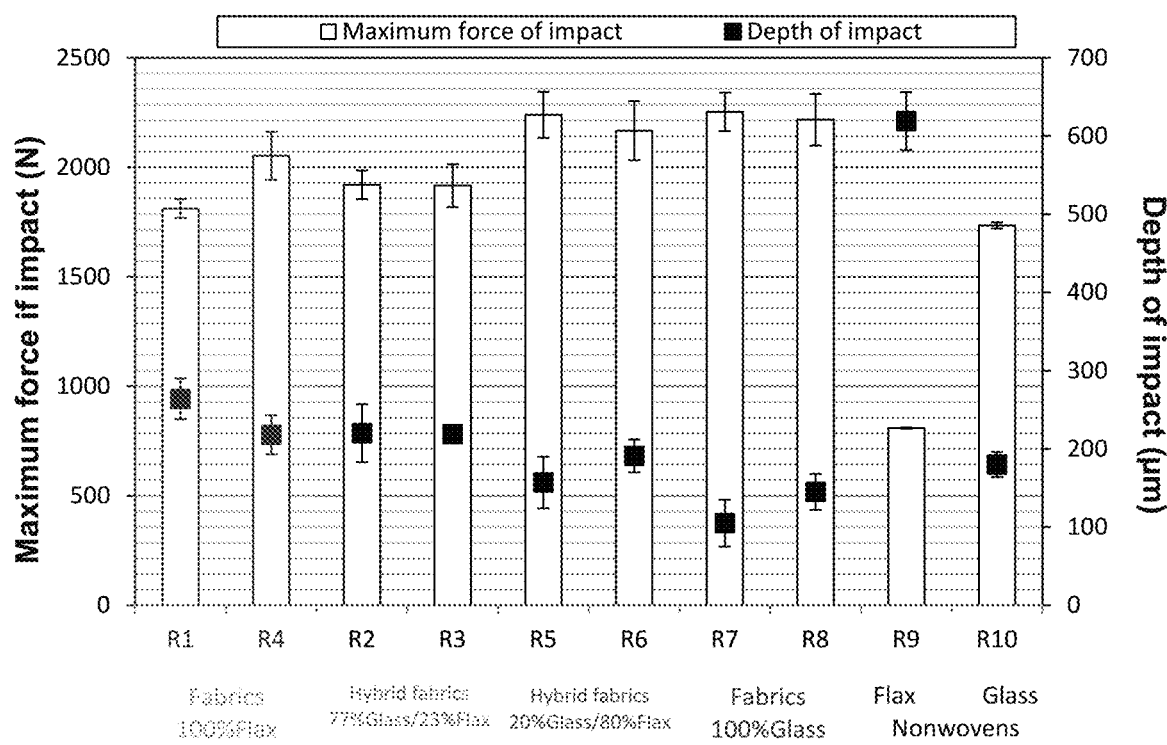
FIG. 4 shows the maximum force of impact and the depth of impact for composites R1, R2, R3, R4, R5, R6, R7, R8, R9, and R10.

The impact resistance of the various composites was measured, in order to illustrate the advantages of the composites with the reinforcements according to the invention. Thus, tests were carried out for each fabric comprising a reinforcement according to the invention (R2, R3, R5 and R6) as well as for control composites corresponding to composites comprising nonwoven reinforcements (R9 and R10) and woven reinforcements made with 100% flax (R1 and R4) and 100% glass (R7 and R8). FIG. 4 summarizes the results obtained.

As can be seen from FIG. 4, which gives the maximum force of impact and the depth of impact for each composite, the composites comprising a reinforcement according to the invention R2, R3, R4, R5, R6 have very good impact resistance.

It should be noted that composites R5 and R6 with glass contents of 20% have excellent impact resistance which is comparable to the impact resistance of the woven samples consisting of 100% glass-fiber yarns.

In other words, the impact resistance of the composites is retained despite around 80% of the glass fibers being replaced with lighter flax fibers.

The composites comprising the reinforcements according to the invention have both excellent mechanical properties, such as satisfactory elasticity in bending or in tension, and excellent impact resistance. They are lighter than the equivalent composites reinforced by textiles consisting of 100% glass fibers.

The invention claimed is:
1. A hybrid textile comprising yarns of inorganic fibers, and yarns of natural organic fibers, the inorganic fibers and the natural organic fibers being co-woven, co-braided or co-knitted with one another,
wherein said hybrid textile comprises between 70 and 90 wt % of natural organic fibers and from 10 to 30 wt % of inorganic fibers, said percentages being expressed relative to the whole of the inorganic fibers and natural organic fibers, and wherein the inorganic fibers are glass fibers and the natural organic fibers are flax fibers.

2. The hybrid textile as claimed in claim 1, comprising between 80 and 90 wt % of natural organic fibers, and from 10 to 20 wt % of inorganic fibers, said percentages being expressed relative to the whole of the inorganic fibers and natural organic fibers.

3. The hybrid textile as claimed in claim 1, wherein the yarns of inorganic fibers and the yarns of natural organic fibers have, independently of one another, a linear weight between 500 and 3,000 tex.

4. The hybrid textile as claimed in claim 1, having:
a thickness below 30 mm; and/or
a weight per unit area between 30 and 3000 g/m$^2$.

5. The hybrid textile as claimed in claim 4, having:
a thickness between 0.2 mm and 5 mm; and/or
a weight per unit area between 100 and 2000 g/m$^2$.

6. The hybrid textile as claimed in claim 5, having:
a thickness between 1 mm and 4 mm; and/or
a weight per unit area between 100 and 1200 g/m$^2$.

7. The hybrid textile as claimed in claim 6, having:
a thickness between 1.5 mm and 3 mm; and/or
a weight per unit area between 100 and 1000 g/m$^2$.

8. A prepreg comprising at least one hybrid textile as claimed in claim 1 and a thermoplastic or thermosetting resin, the resin representing from 20 to 45 wt % of the total weight of the prepreg.

9. The prepreg as claimed in claim 8, wherein the resin represents from 25 to 40 wt % of the total weight of the prepreg.

10. A composite comprising an organic polymer matrix and a hybrid textile as claimed in claim 1.

11. The hybrid textile as claimed in claim 1, wherein the linear weight of the yarns of organic fibers is lower than that of the inorganic fibers.

12. The hybrid textile as claimed in claim 1, wherein the glass fibers have a diameter comprised between 5 and 24 µm.

* * * * *